United States Patent [19]

Denning et al.

[11] Patent Number: 4,821,979
[45] Date of Patent: Apr. 18, 1989

[54] VARIABLE AREA EXHAUST NOZZLE FOR A GAS TURBINE ENGINE

[75] Inventors: Ralph M. Denning; John M. Hall, both of Bristol; Terence Jordan, Gloucestershire, all of England

[73] Assignee: Rolls-Royce PLC, England

[21] Appl. No.: 86,398

[22] Filed: Aug. 17, 1987

[30] Foreign Application Priority Data

Aug. 29, 1986 [GB] United Kingdom ............ 8620879

[51] Int. Cl.$^4$ .............................................. B64C 15/02
[52] U.S. Cl. ................................ 244/23 D; 244/12.5; 244/52; 244/53 R; 60/232; 239/265.33
[58] Field of Search ............... 244/53 R, 12.5, 23 D, 244/52, 17.19; 60/232, 230, 228; 239/265.19, 265.23, 265.33, 265.37, 265.35

[56] References Cited

U.S. PATENT DOCUMENTS

| | | | |
|---|---|---|---|
| 2,625,008 | 1/1953 | Crook | 239/265.33 |
| 2,734,698 | 2/1956 | Straayer | 60/232 |
| 3,347,466 | 10/1967 | Nichols | 239/265.19 |
| 3,386,248 | 6/1968 | Pike et al. | 239/265.33 |
| 3,398,896 | 8/1968 | Rabone | 60/232 |
| 3,774,868 | 11/1973 | Goetz | 239/265.19 |
| 3,863,867 | 2/1975 | Soustin | 244/12.5 |
| 3,986,687 | 10/1976 | Beavers | 244/12.5 |
| 4,175,385 | 11/1979 | Nash | 60/232 |
| 4,714,197 | 12/1987 | Thayer et al. | 237/265.19 |

FOREIGN PATENT DOCUMENTS

1058933 2/1967 United Kingdom .
1561139 2/1980 United Kingdom .

Primary Examiner—Galen Barefoot
Assistant Examiner—Rodney Corl
Attorney, Agent, or Firm—Oliff & Berridge

[57] ABSTRACT

A nozzle for a gas turbine engine having a first fixed petal 44 and a second movable petal 46 which is pivotally mounted at a point intermediate its leading edge 46(a) and its trailing edge 46(b). Actuation means 48 are provided to move the nozzle between a first and a second position. In the petals first position, its leading edge 46(a) is positioned forward of and slightly radially inward of the trailing edge 50 of the exhaust duct 52, such that a small ejector gap 54 is provided therebetween and the trailing edge 46(b) approaches the trailing edge 44(b) of the fixed petal, such that the gap therebetween defines the exit area of the nozzle 36. In the petals second position (shown dotted), its leading edge 46(a) is moved radially inwards of its trailing edge 46(b) such that the exit area of the nozzle is defined by the area between the trailing edge 50 of the exhaust duct 52 on the second petal side and the trailing edge of the first petal 44(b). An ejector gap 56 is also provided on the fixed petal side and acts to aid the flow of air over the outside surfaces of the petals.

8 Claims, 4 Drawing Sheets

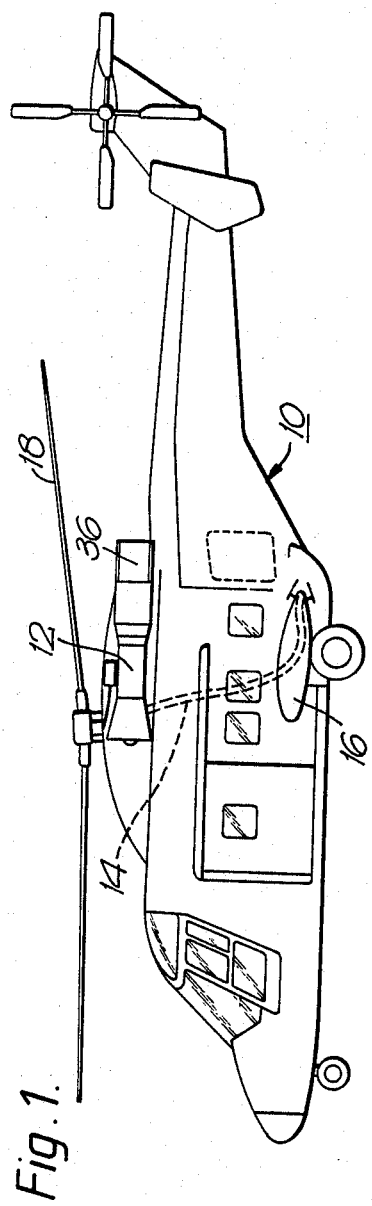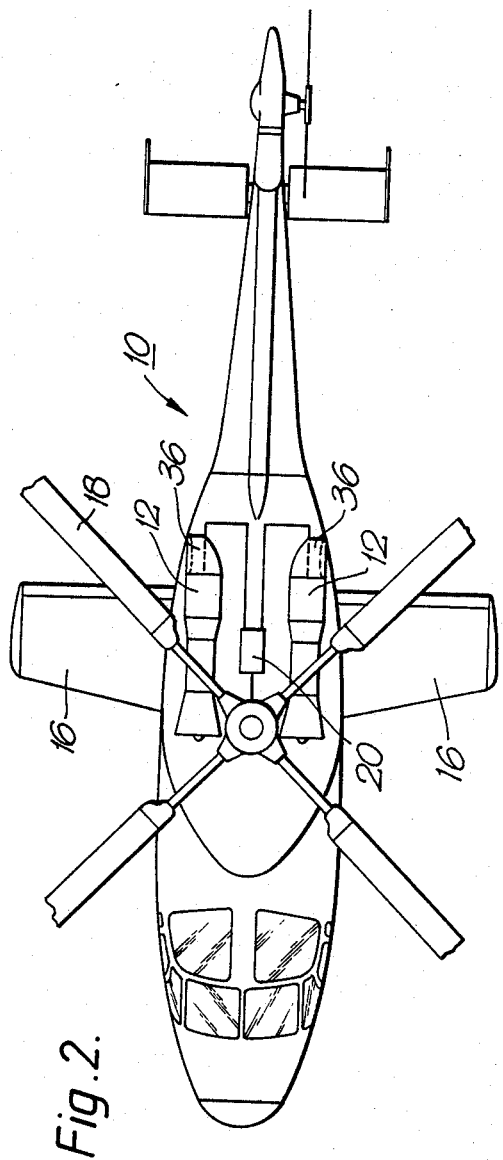

VARIABLE AREA EXHAUST NOZZLE FOR A GAS TURBINE ENGINE

This invention relates to variable area exhaust nozzles for gas turbine engines and is particularly relevant to nozzles provided in engines used as the power-plant for compound helicopters.

British Pat. no 2,130,984 discloses a so-called compound helicopter in which two bypass type gas turbine engines are installed in a helicopter provided with an augmentor wing. Bypass air is directed from the engine via ducting to each augmentor wing which is adapted to augment the thrust and lift of the helicopter rotor blades. Such augmentor wings are more particularly described in United States of America patent specification no. 3,332,664.

The gas turbine engines of the compound helicopter mentioned above are of the free turbine configuration. A low pressure power turbine is coupled to the helicopter rotors while a high pressure turbine drives the engine compressor. A variable area exhaust nozzle is provided to vary the pressure drop across the power turbine and in order to control the power output to the rotor blades. When maximum power is required for hovering or vertical take-off the exhaust nozzle is set to maximum area to provide a high pressure drop across the power turbine. For maximum forward speed the exhaust nozzle is set to a minimum to increase the momentum of the exhaust gases and give maximum forward thrust.

It is an object of the present invention to provide a gas turbine engine exhaust nozzle suitable for use in the above mentioned application which is simple, robust and lightweight whilst still being able to provide sufficient control over the speed of the free turbine to enable safe operation of the helicopter.

The invention will now be described by way of example only with reference to the accompanying drawings in which:

FIGS. 1 and 2 show side and plan views respectively of a compound helicopter.

Figure 3:
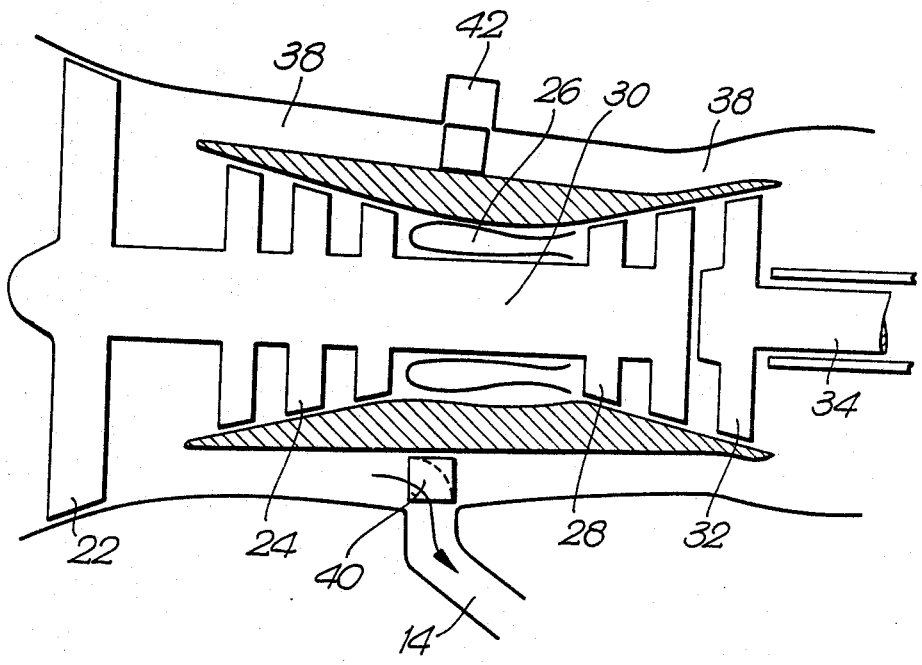
FIG. 3 shows diagramatically a gas turbine engine suitable for use in the above mentioned helicopter.

Referring to FIGS. 1 and 2, a helicopter 10 has two gas turbine engines 12 of the bypass type. Ducting 14 is provided to carry bypass air to two augmentor wings 16 of the Whittley type which can augment the lift and thrust provided by a main rotor 18 which is driven by the power turbines of each engine 12 via a main gearbox 20.

Referring now to FIG. 3, each engine 12 has a fan 22 mounted at its upstream end which serves to raise the pressure of the incoming air.

Downstream of the fan 22 the flow is split into a bypass flow and a core flow. The core flow is further compressed by a multi-stage core compressor 24 and is then heated in an annular combustion chamber 26. The core flow passes from the combustion chamber 26 to drive the high pressure turbine 28. The core compressor 24, the combustion chamber 26 and the high pressure turbine 28 are collectively known as the core gas generator. The fan 22, core compressor 24 and the high pressure turbine 28 are all mounted on a common shaft 30 so that the fan 22 and compressor 24 may be driven by the high pressure turbine 28.

Figure 4:
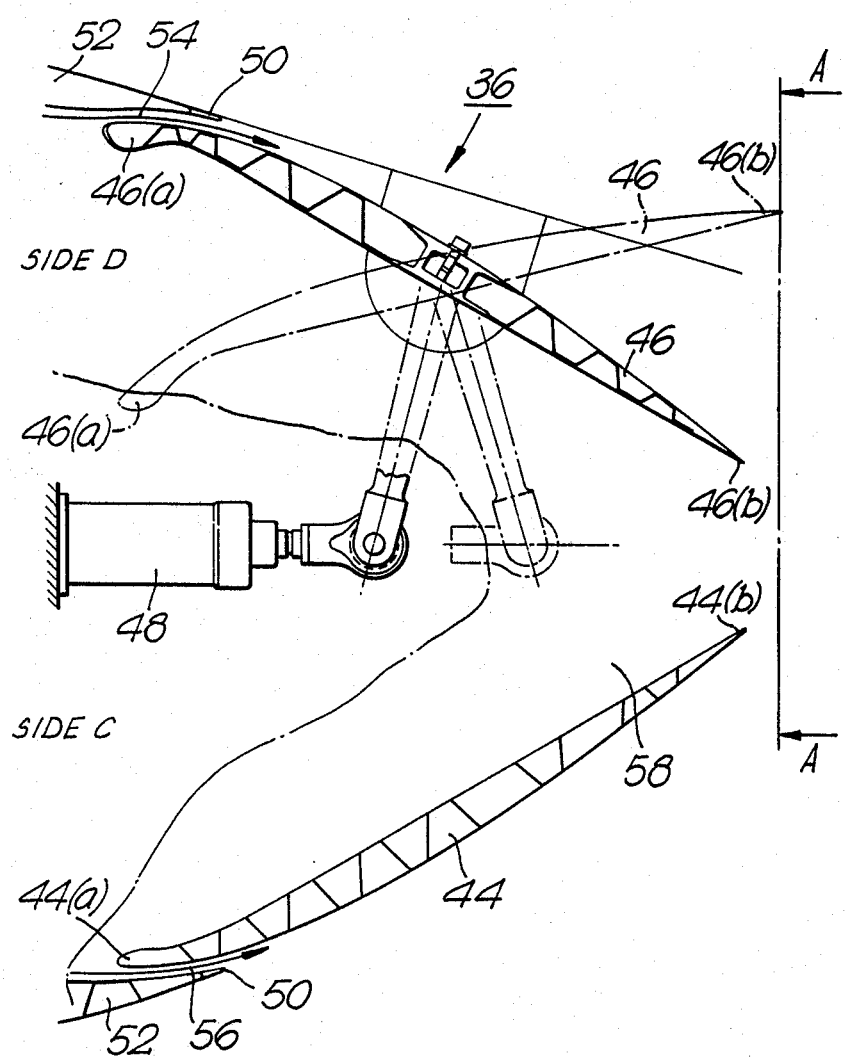
FIG. 4 is a detailed cross-sectional view of an exhaust nozzle shown in FIGS. 1 to 3.

A free power turbine 32 is located downstream of the high pressure turbine 28 and is also driven by the core flow which is expanded therethrough. The free power turbine 32 is mounted on an output shaft 34 which is linked to the helicopter main gearbox 20. Finally, the core gases pass through a variable area final nozzle 36 (shown in FIGS. 4 and 5) and vent to atmosphere.

The bypass air flows from the fan 22 into an annular bypass duct 38 in which a changeover valve 40 is situated. Such valves are well known in the art and need not be described in detail herein. Suffice to say that in a first position the changeover valve diverts the bypass air into an annular scroll chamber 42 and in a second position obtained by turning the valve 40 allows the bypass air to continue along the bypass duct 38. Ducting 14 links the scroll chamber 42 with the augmentor wings 16.

When the engine is in the first mode, that is with the changeover valve 40 diverting bypass air to the augmentor wings 16, the helicopter rotor blades 18 are driven by the free power turbine 32. The variable area nozzle 36 is used to vary the pressure ratio across the free power turbine 32 at any given engine speed. A relatively high pressure drop generates more power for driving the rotor blades 18 which at low aircraft speed compensates for the reduced lift generated by the wings 16. At higher aircraft speeds the nozzle area is reduced so that the pressure drop across the nozzle gives greater jet thrust by increasing the exit velocity of the core gases while a lower pressure drop across the power turbine is acceptable as the wing generates more lift.

In the second mode, the changeover valve 40 allows bypass air to continue along the bypass duct 38 and mix with the core gas. In this mode the augmentor wings 16 receive no bypass air. At very low forward speeds or when the aircraft is hovering or taking off the rotor blades 18 driven by the free power turbine are the only means of generating lift. In this mode the variable area nozzle 36 would be at a maximum area position so that little jet thrust is generated.

A nozzle 36 capable of controlling the speed of a free power turbine 32 in the manner described above is shown in FIGS. 4 and 5. The nozzle comprises a first fixed petal 44 on a first side C and a second movable petal 46 on a second side D. The movable petal 46 is pivotally mounted at a point intermediate its leading edge 46(a) and its trailing edge 46(b) to the sidewalls 58 of the nozzle 36 and is provided with an actuator means 48, well known per se and therefore not described herein, to move it between a first position and a second position. In the first position of the movable petal 46 (shown in full lines in FIG. 4) its leading edge 46(a) is positioned forward of and slightly radially inward of the trailing edge 50 of the exhaust duct 52, such that a small ejector gap 54 is provided therebetween; and the trailing edge 46(b) approaches the trailing edge 44(b) of the fixed petal, such that the gap therebetween defines the exit area of the nozzle. In the second position of the movable petal 46 (shown dotted in FIG. 4) its leading edge 46(a) is moved radially inward of its trailing edge 46(b) such that the exit area of the nozzle is defined by the area between the trailing edge of the exhaust duct 52 on the nozzle's second side D and the trailing edge of the first nozzle on the first petal 44(b).

An ejector gap 56 is also provided at the upstream end 44(a) of the fixed petal. The function of either ejector gap is to allow a small portion of the exhaust gases to pass over the radially outward side of the petals 44, 46 so as to help maintain the flow of air over the outside of the nozzle at high forward speeds.

Figure 5:
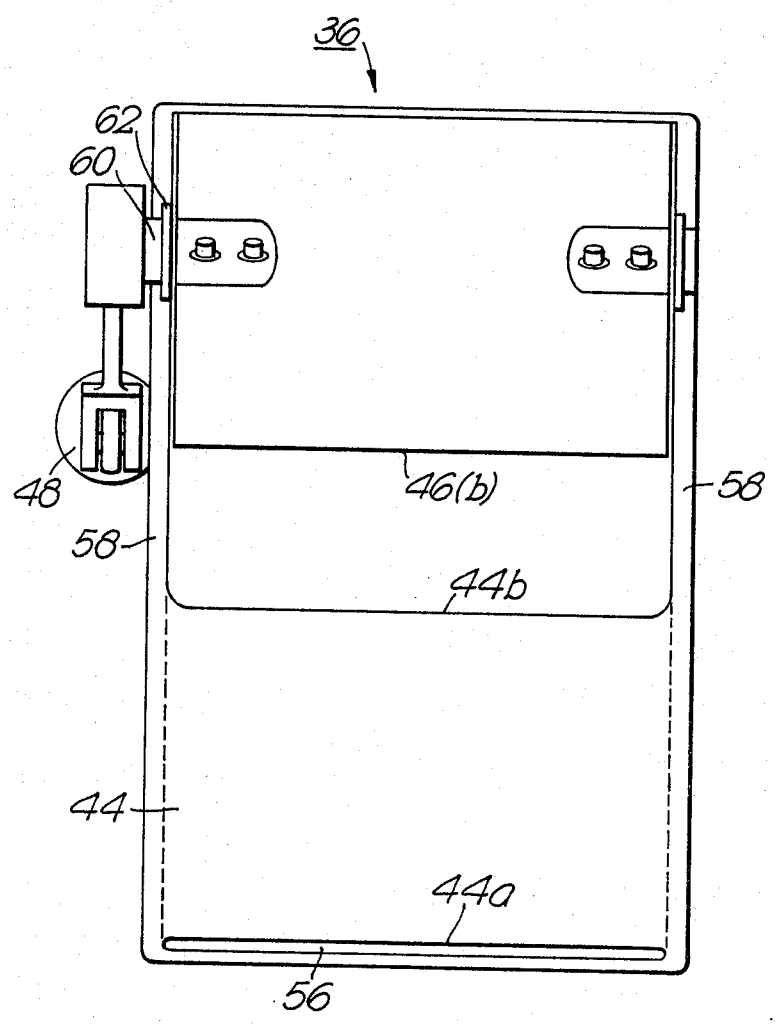
FIG. 5 is a view of the nozzle in the direction of arrows A—A in FIG. 4.

From FIG. 5 it can be seen that the first fixed petal 44 is integrally joined to the sidewalls 58 whilst the movable petal 46 rotates therein by means of shaft 60 and bearing 62.

It will be appreciated that the above described nozzle 36 need not necessarily be provided with ejector gaps 54, 56 in order to effectively control the free power turbine 32 in the manner described above. If the ejector gaps 54, 56 are removed it will be necessary to seal the joint between the leading edges 44(a), 46(a) of the petals 44, 46 and the trailing edge of the exhaust duct 50 when the second movable petal 46 is in its first position.

We claim:

1. A variable area exhaust nozzle for a gas turbine engine comprising:
   an exhaust duct having a trailing edge on a first and a second side of said nozzle;
   a first fixed portion fixed relative to the exhaust duct on the first side of said nozzle and being provided with a trailing edge;
   a second movable portion on the second side of said nozzle and being provided with a leading edge and a trailing edge;
   the second movable portion being pivotable about an axis which is positioned between its leading edge and its trailing edge, between a first position in which an exit of the nozzle is defined between the trailing edge of the first fixed portion and the trailing edge of the second movable portion, and a second position in which the exit of the nozzle is defined between the trailing edge of the first fixed portion and the trailing edge of the exhaust duct on the second side of the nozzle.

2. A variable area exhaust nozzle as claimed in claim 1 in which when the second movable portion is in its first position its leading edge is positioned forward of and inward of the trailing edge of the exhaust duct on the second side of the nozzle and the trailing edge of the second movable portion is inward of the leading edge of said movable portion.

3. A variable area exhaust nozzle as claimed in claim 1 in which when the second movable portion is in its second position the leading edge of said movable portion is inward of the trailing edge of said movable portion.

4. A variable area exhaust nozzle as claimed in claim 1 in which when the second movable portion is in its first position a gap is provided between the leading edge of said movable portion and the trailing edge of the exhaust duct on the second side of the nozzle for the passage of exhaust gases therethrough.

5. A variable area exhaust nozzle as claimed in claim 1 in which the first fixed portion is provided with a leading edge which is spaced from the trailing edge of the exhaust duct such that a gap is formed therebetween for the passage of exhaust gases therethrough.

6. A variable area exhaust nozzle as claimed in claim 4 in which a small portion of the exhaust gases are passed through the gap formed between the leading edge of the movable portion and the trailing edge of the exhaust duct so as to entrain air to flow over an outward side of said movable portion.

7. A variable area exhaust nozzle as claimed in claim 5 in which a small portion of the exhaust gases are passed through the gap formed between the leading edge of the fixed portion and the trailing edge of the exhaust duct so as to entrain air to flow over an outward side of said fixed portion.

8. A variable area exhaust nozzle as claimed in claim 1, wherein said second position provides a substantially larger exhaust exit than said first position.

* * * * *